(12) United States Patent
Zhou et al.

(10) Patent No.: US 12,425,937 B2
(45) Date of Patent: Sep. 23, 2025

(54) UE REQUESTED SMTC WINDOW CONFIGURATION ADAPTATION

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/919,509

(22) PCT Filed: May 29, 2020

(86) PCT No.: PCT/CN2020/093295
§ 371 (c)(1),
(2) Date: Oct. 17, 2022

(87) PCT Pub. No.: WO2021/237687
PCT Pub. Date: Dec. 2, 2021

(65) Prior Publication Data
US 2023/0145848 A1 May 11, 2023

(51) Int. Cl.
*H04W 36/00* (2009.01)
*H04W 36/06* (2009.01)
*H04W 48/14* (2009.01)

(52) U.S. Cl.
CPC ....... *H04W 36/0088* (2013.01); *H04W 36/06* (2013.01); *H04W 48/14* (2013.01)

(58) Field of Classification Search
CPC .. H04W 36/0088; H04W 36/06; H04W 48/14
See application file for complete search history.

(56) References Cited

U.S. PATENT DOCUMENTS

| 10,568,128 | B2 | 2/2020 | Li et al. |
| 2018/0351611 | A1 | 12/2018 | Nagaraja et al. |
| 2019/0254110 | A1* | 8/2019 | He ............. H04L 41/0896 |
| 2021/0051618 | A1 | 2/2021 | Yang et al. |
| 2021/0160798 | A1 | 5/2021 | Zheng et al. |

FOREIGN PATENT DOCUMENTS

| CN | 110831042 A | 2/2020 |
| CN | 110943818 A | 3/2020 |
| WO | 2018231785 A1 | 12/2018 |

(Continued)

OTHER PUBLICATIONS

International Search Report and Written Opinion—PCT/CN2020/093295—ISA/EPO—Feb. 24, 2021.

(Continued)

*Primary Examiner* — Khoa Huynh
(74) *Attorney, Agent, or Firm* — Procopio, Cory, Hargreaves & Savitch LLP

(57) ABSTRACT

Methods, apparatuses, and computer readable medium for wireless communication at a wireless device is provided to facilitate synchronization signal block measurement timing configuration (SMTC) adjustment requested by a user equipment. An example method includes requesting an adjustment to SMTC. The example method further includes performing radio resource management (RRM) measurements based on a modified SMTC.

24 Claims, 10 Drawing Sheets

(56) References Cited

FOREIGN PATENT DOCUMENTS

| | | |
|---|---|---|
| WO | 2019157661 A1 | 8/2019 |
| WO | 2019160266 A1 | 8/2019 |
| WO | 2020082208 A1 | 4/2020 |
| WO | WO-2020259789 A1 * | 12/2020 |

OTHER PUBLICATIONS

Supplementary European Search Report—EP20937609—Search Authority—Munich—Jan. 23, 2024.

* cited by examiner

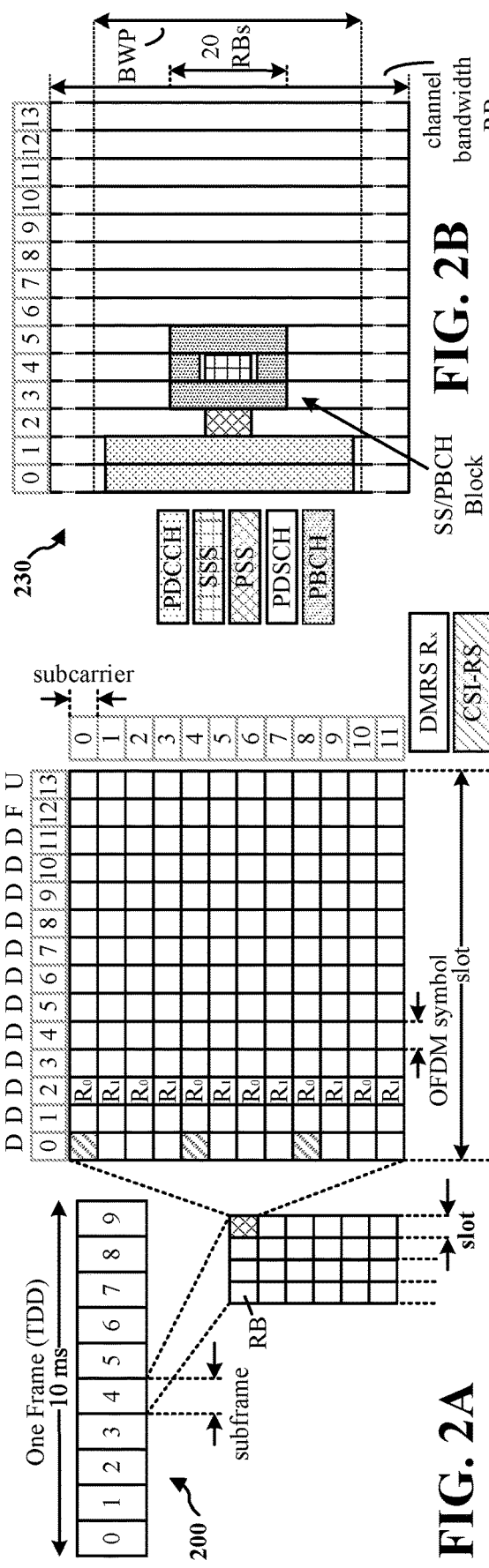
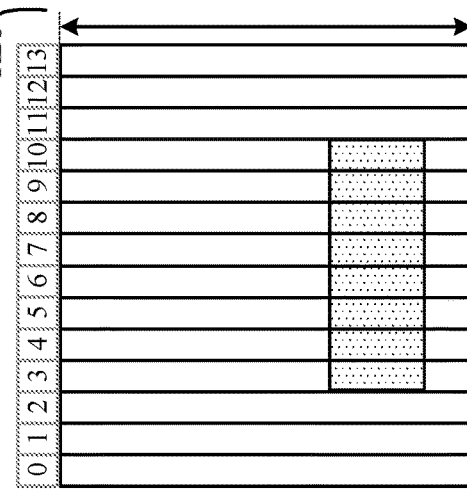
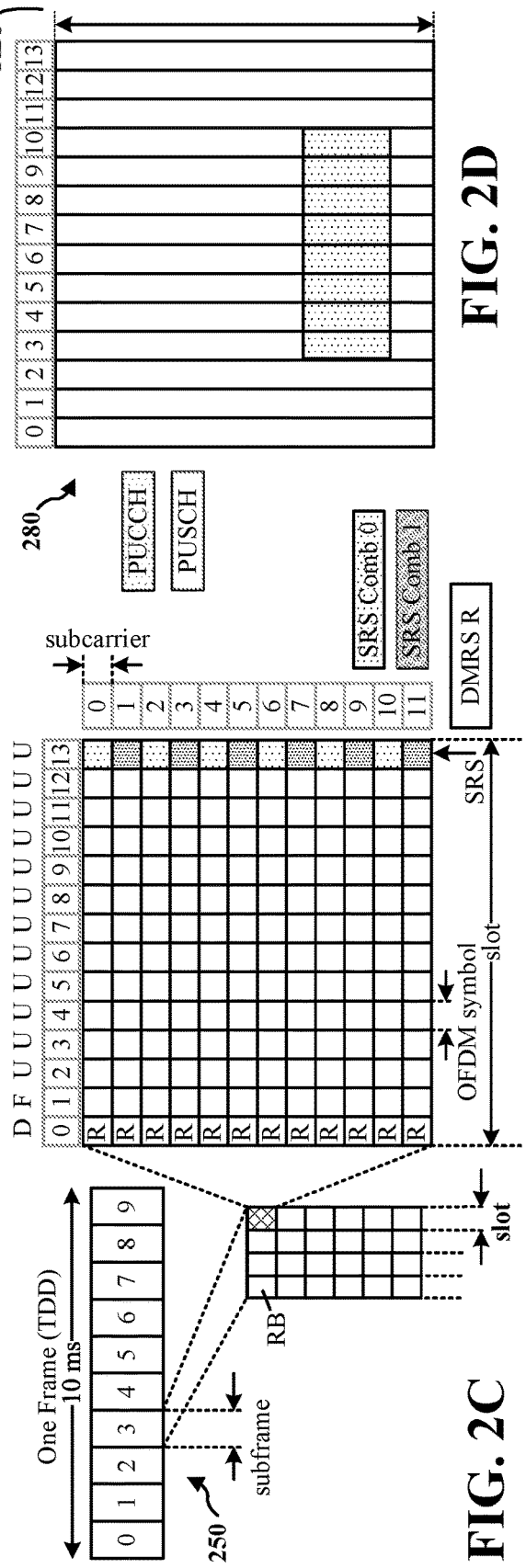
FIG. 2A  FIG. 2B  FIG. 2C  FIG. 2D

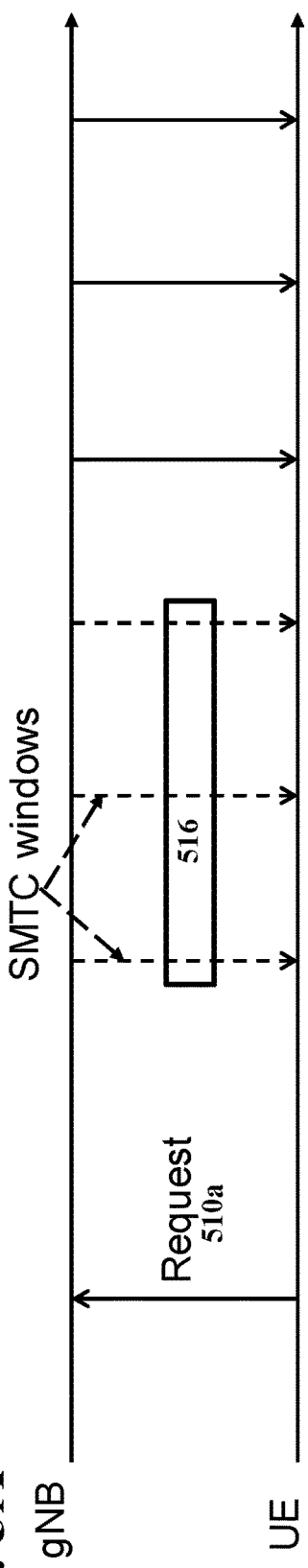
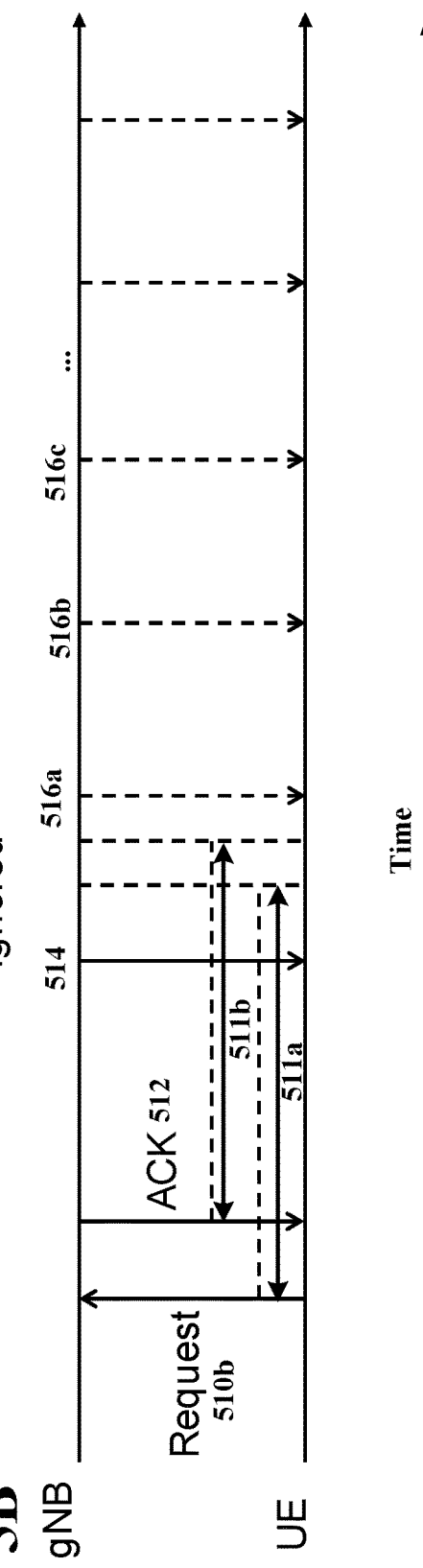

UE REQUESTED SMTC WINDOW CONFIGURATION ADAPTATION

CROSS REFERENCE TO RELATED APPLICATION(S)

This application is a National Stage Application filed under 35 U.S.C. § 371 of PCT International Application Serial No. PCT/CN2020/093295 entitled "UE REQUESTED SMTC WINDOW CONFIGURATION ADAPTATION" and filed on May 29, 2020, which is expressly incorporated by reference herein in its entirety.

BACKGROUND

Technical Field

The present disclosure relates generally to communication systems, and more particularly, to wireless communication including synchronization signal block (SSB) measurement timing configuration (SMTC).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communication, radio resource management (RRM) measurements may be performed to facilitate management of radio resources. In order to more efficiently perform RRM measurements, an SMTC is introduced to define the RRM measurements on certain resources. The SMTC may define various parameters, such as periodicity, offset, duration, or the like, for RRM measurements. The user equipment (UE) may conduct RRM measurements within an SMTC window defined by the various parameters, for example. A base station may configure the SMTC for RRM measurements via radio resource control signaling (RRC). Based on the configuration, the UE may perform SSB measurements in one or more configured SMTC window occasions. However, the UE may be separately configured to autonomously (e.g., without signaling from base station) measure SSBs of neighbor cells from an SSB burst set before a SMTC window. It may be less efficient for the UE to perform the RRM measurements in the SMTC window, because the UE may be able to reuse the measurement of the SSBs from the burst set before the SMTC window for the RRM measurement results. A mechanism for SMTC configuration adaptation is provided to improve the efficient use of resources, such as enabling skipping of SMTC window occasions which in turn may provide more resources for data transmission.

In an aspect of the disclosure, a method, a computer-readable medium, and an apparatus are provided. The apparatus is configured to request an adjustment to a SMTC. The apparatus is further configured to perform RRM measurements based on a modified SMTC.

In another aspect of the disclosure, a method, a computer-readable medium, and an apparatus are provided. The apparatus is configured to configure a SMTC for a UE. The apparatus is further configured to receive a request for an adjustment to the SMTC from the UE. The apparatus is further configured to transmit an SSB for RRM measurements based on a modified SMTC in response to the request from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 5A and 5B illustrates example skipping of SMTC windows.

DETAILED DESCRIPTION

Figure 1:
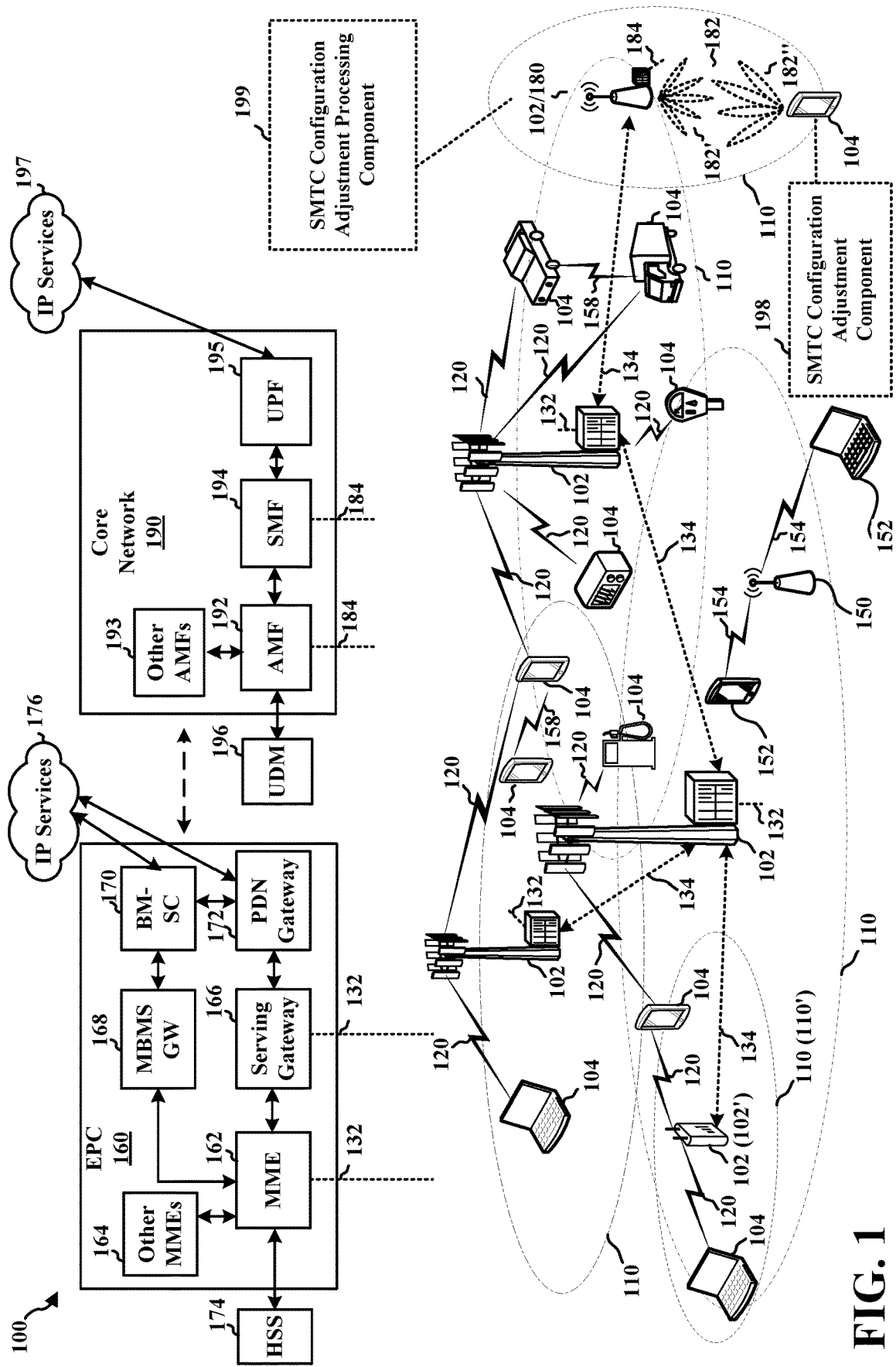
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, SMTC configuration adjustment component 198 of the UE 104 may be configured to request an adjustment to a SMTC. The SMTC configuration adjustment component 198 of the UE 104 may be further configured to perform RRM measurements based on a modified SMTC. In some aspects, the SMTC configuration adjustment processing component 199 of the base station 180 may be configured to configure an SMTC for a UE. SMTC configuration adjustment processing component 199 of the base station 180 may be further configured to receive a request for an adjustment to the SMTC from the UE. The SMTC configuration adjustment processing component 199 of the base station 180 may be further configured to transmit an SSB for RRM measurements based on a modified SMTC in response to the request from the UE.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μt=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may be associated with a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
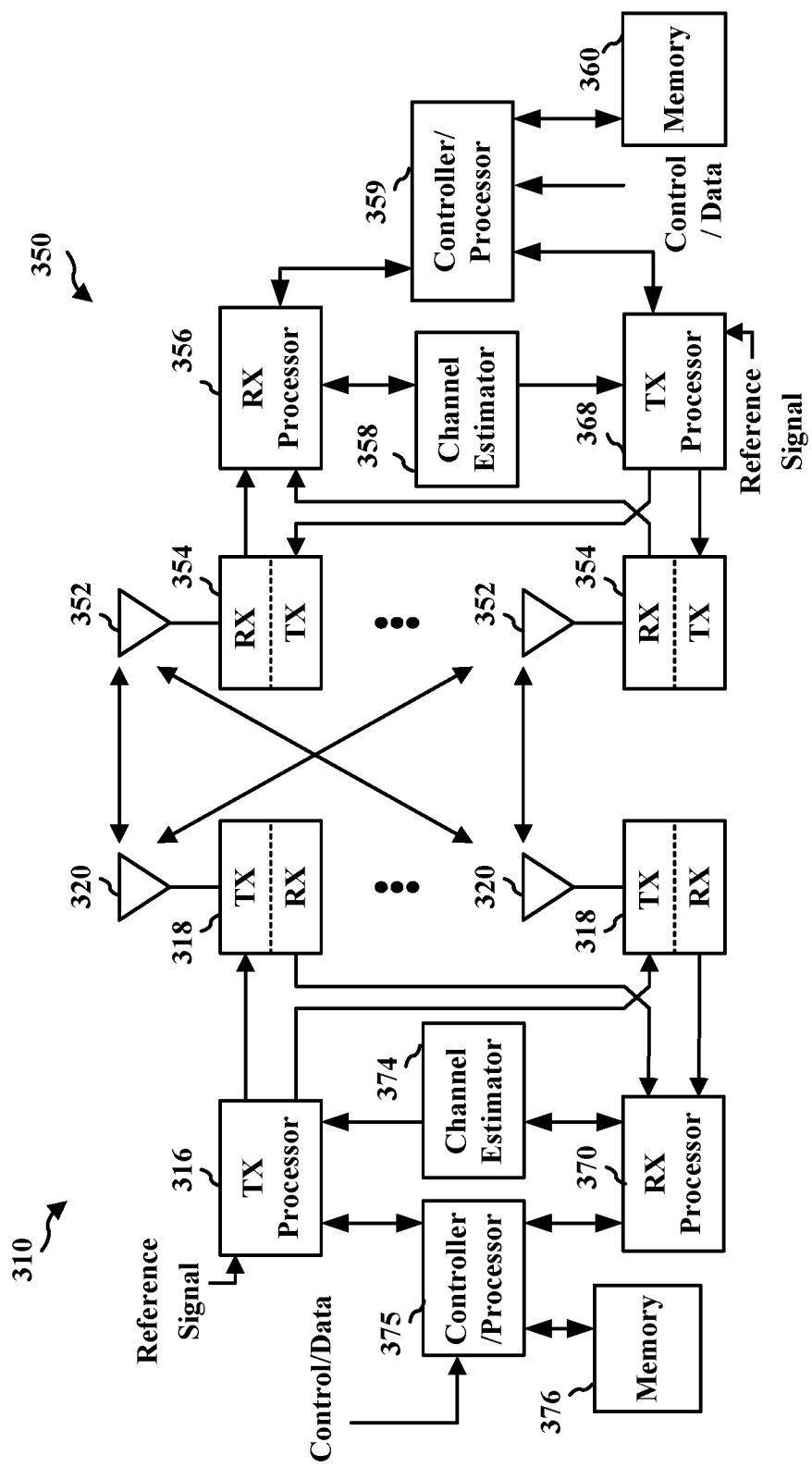
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SMTC configuration adjustment component 198 of FIG. 1.

At least one of the TX processor 316, the RX processor 370, and the controller/processor 375 may be configured to perform aspects in connection with the SMTC configuration adjustment processing component 199 of FIG. 1.

Figure 6:
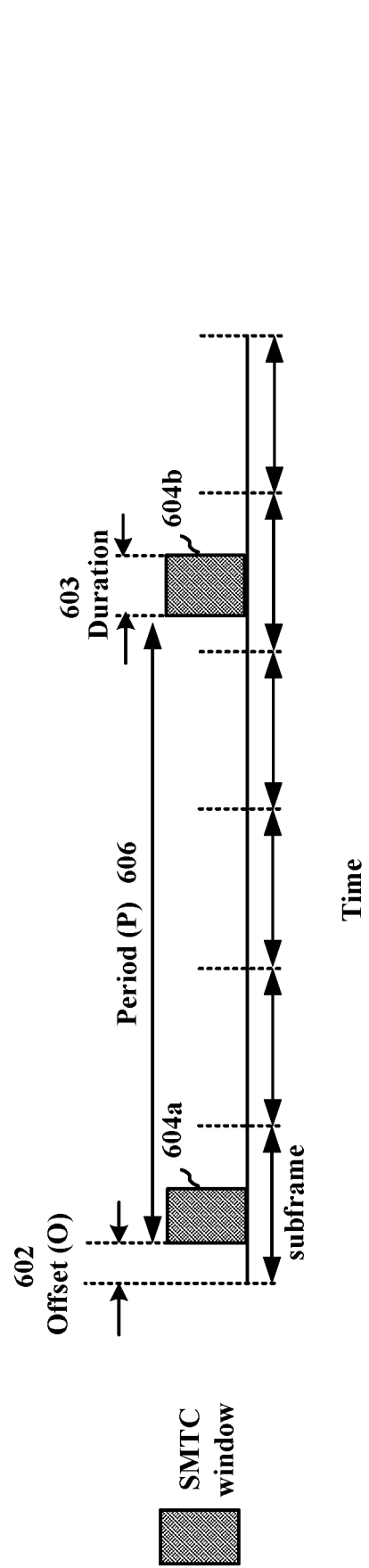
FIG. 6 illustrates example SMTC windows.

In wireless communication, radio resource management (RRM) measurements may be performed to facilitate management of radio resources. In order to more efficiently perform RRM measurements, an SMTC is introduced to define the RRM measurements on certain resources. The SMTC may define various parameters, such as periodicity, offset, duration, an indication of a second SMTC window, or the like, for RRM measurements. FIG. 6 illustrates an example SMTC having a periodicity 606 of 4 subframes. FIG. 6 also illustrates an example offset 602 of the SMTC window with respect to the beginning of a subframe and an example duration of the SMTC window. Within an SMTC window defined by the various parameters (e.g., periodicity, offset, duration 603, second SMTC window, etc.), a user equipment (UE) may conduct RRM measurements based on transmissions (e.g., SSB) received from the base station. The SMTC for the RRM measurements may be configured by the base station via radio resource control (RRC) signaling. The RRC signaling may indicate any of a periodicity, an offset, a duration, a second SMTC, a list of cells to which the SMTC applies, etc. Based on the configuration, the UE may perform SSB measurements in one or more configured SMTC window occasions. However, the UE may be separately configured to autonomously (e.g., without signaling from base station) measure SSBs of neighbor cells from an SSB burst set before a SMTC window. As a result, if the UE performs the RRM measurements in the SMTC window, it may be inefficient usage of the resources because the UE can reuse the measurement of the SSBs from the burst set before the SMTC window as the RRM measurement results. A mechanism for SMTC configuration adaptation is provided to enable more efficient usage of resources, such as enabling skipping of SMTC window occasions in some situations, which in turn frees up more resources for data transmission.

Figure 4:
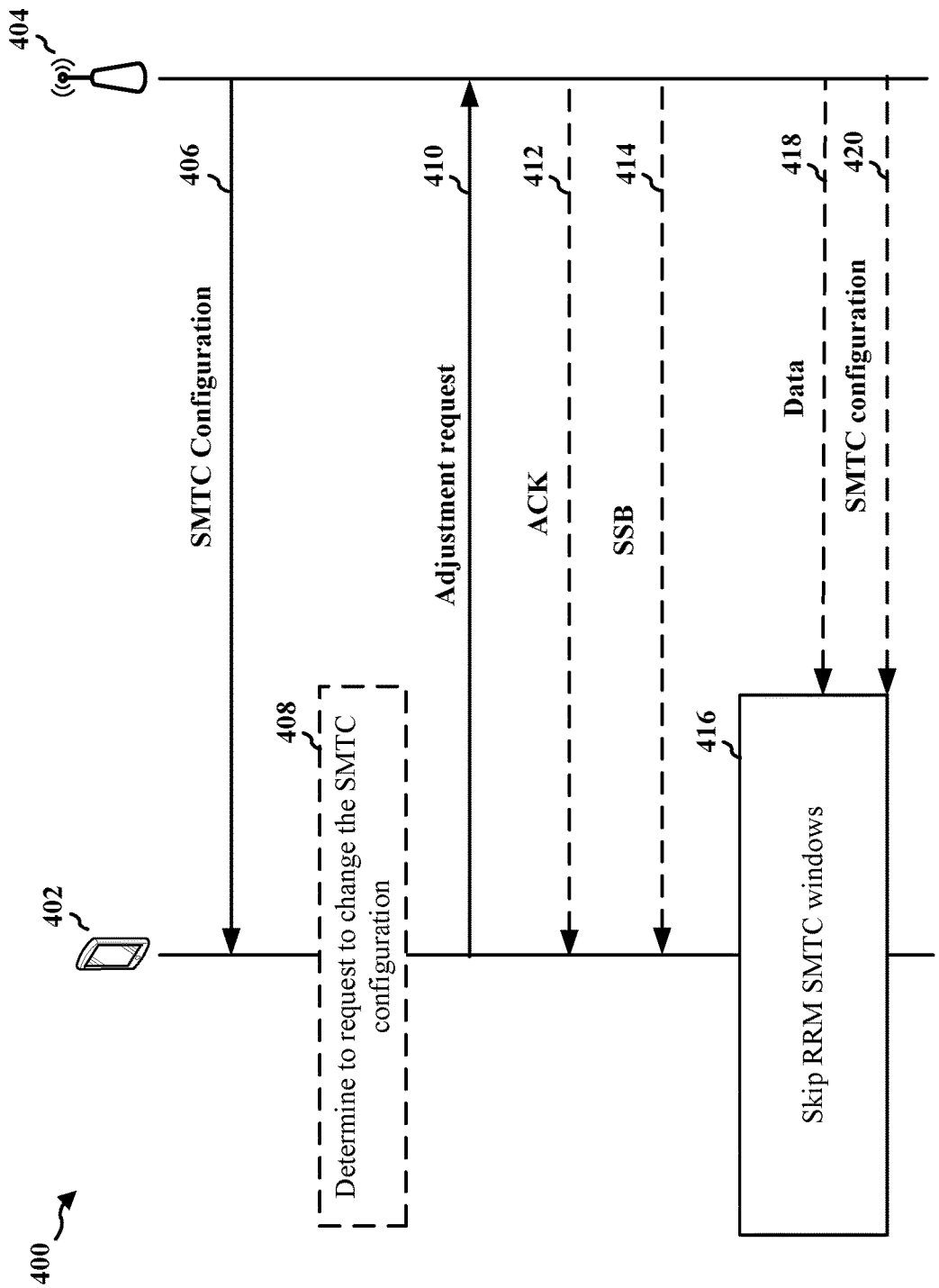
FIG. 4 illustrates an example communication flow between a base station and a UE.

FIG. 4 illustrates an example communication flow 400 between a base station 404 and a UE 402. Aspects of the base station 404 may be implemented by the base station 102/180 of FIG. 1, the apparatus 1002 of FIG. 10, or the like. Aspects of the UE 402 may be implemented by the UE 104 of FIG. 1, the apparatus 902 of FIG. 9, or the like. In the illustrated example of FIG. 10, the UE 402 may receive an SMTC configuration, at 406, from the base station 404. In some aspects, the SMTC configuration may include one or more of: a periodicity, an offset, a duration, one or more optional SMTC windows corresponding periodicity, and/or a PCI list or other cell list for the one or more optional SMTC windows. The periodicity may be indicated in an amount of subframes, e.g., an amount of subframes between SMTC windows. Based on the SMTC configuration, the UE 402 may be able to perform RRM measurements in one or more SMTC windows, such as during the SMTC windows illustrated in the example in FIG. 6.

At 408, the UE 402 determines to request to change the SMTC configuration. In some aspects, the UE 402 may determine to change the SMTC configuration based on measuring neighbour cell SSBs from a SSB burst set before the one or more SMTC windows. The measurement may be performed, e.g., based on an autonomous determination at the UE rather than a configuration to perform the measurements before the SMTC windows. In some aspects, the UE 402 may determine to request a change to the SMTC configuration. The UE may determine to request the change based on performed measurements on neighbour cell SSBs from a SSB burst set before the one or more SMTC windows, for example. In some aspects, the UE 402 may request the change to the SMTC configuration based on other parameters, such as the UE's remaining battery life relative to a threshold, or the like. By prompting a change in the SMTC configuration, the UE 402 can more efficiently utilize resources, such as radio resources, because the UE 402 and the base station 404 may instead utilize resources that were scheduled for the SMTC windows to exchange data.

At 410, the UE 402 transmits an SMTC adjustment request to the base station 404. The request may include any SMTC window configuration parameters, such as periodicity, offset, duration, PCI list, for each SMTC window, and whether an additional SMTC window(s) is needed. The request may be sent via a medium access control-control element (MAC-CE), uplink control information (UCI), or a radio resource control (RRC) message. For a request sent via a MAC-CE, if the UE 402 knows an existing uplink (UL) grant when the request is generated, the MAC-CE can be piggybacked on the known UL grant for the PUSCH. Otherwise, the UE can solicit an UL grant by sending a scheduling request (SR) via PUCCH if a PUCCH is configured, or via random access channel (RACH) if a PUCCH is not configured. For a request sent via UCI, the UE may send the UCI field for the request in a PUCCH or multiplexed in a PUSCH.

FIGS. 5A and 5B illustrate modifications to an SMTC. For example, as illustrated in FIGS. 5A, the UE may transmit a request 510*a* to the base station. Then, the UE may skip and one or more SMTC windows at 516 based on the request 510*a*.

In some aspects, a configuration or rule may define an application time to control when the skipping will take effect following a request. In some aspects, the UE 402 may skip RRM measurement, at 416, after the application time, e.g., a particular amount of time, has passed following the transmission of the adjustment request 410 or 510*a*. The resources for the skipped SMTC windows may be reused by the base station 404 for data transmission at 418. In some aspects, the application time may define a time at which the UE 402 may skip RRM measurement, at 416, after reception of an acknowledgment, at 412, from the base station 404. In some aspects, the base station may further transmit, at 414, an SSB for RRM measurements before the skipping takes effect.

Referring to the example illustrated in FIG. 5B, two application times are shown for illustrative purpose. An example application time 511*a* may be an amount of time after transmitting the request 510*b* after which the UE may skip RRM measurement during the configured SMTC windows. Another example application time 511*b* may define an amount of time after reception of an acknowledgment at 512 when the UE may skip the RRM measurements during the configured SMTC windows. In some aspects, the acknowledgment may be sent from the base station 404 in PDCCH. In some aspects, the acknowledgment may be sent from the base station 404 in a dedicated feedback channel as downlink feedback information. The SMTC window 514 may still be utilized for RRM measurements in FIG. 5B, because the application time has not passed. Subsequent SMTC windows 516*a*, 516*b*, 516*c*, etc., may be skipped based on the specific temporary or persistent change requested by the UE. The subsequent SMTC windows 516*a*, 516*b*, 516*c*, etc. may be used for data transmission between the base station and the UE.

In some aspects, the request is for a temporary change that is valid for a period of time, e.g., for one or more SMTC windows. The request may include a subset of the remaining SMTC windows that the UE indicates or requests to skip. As a result, the UE 402 may skip one or more SMTC windows or the subset of the remaining SMTC windows after sending the request.

In some aspects, the request is for a persistent change that is valid until a further configuration from the base station. As a result, the UE 402 may skip future SMTC windows until further configuration is received at 420.

FIG. 6 illustrates example SMTC windows. In the illustrated example of FIG. 6, one or more SMTC windows 604*a* and 604*b* are scheduled periodically with a period P at 606 between the adjacent SMTC windows. The period may be defined based on subframes or frames. Each SMTC window may last for a duration D (e.g., at 603). An offset O at 602 based on reference timing, such as based on frame timing or half frame timing, may be introduced. The offset may be used by the UE to determine timing of the one or more SMTC windows 604*a* and 604*b*.

Figure 7:
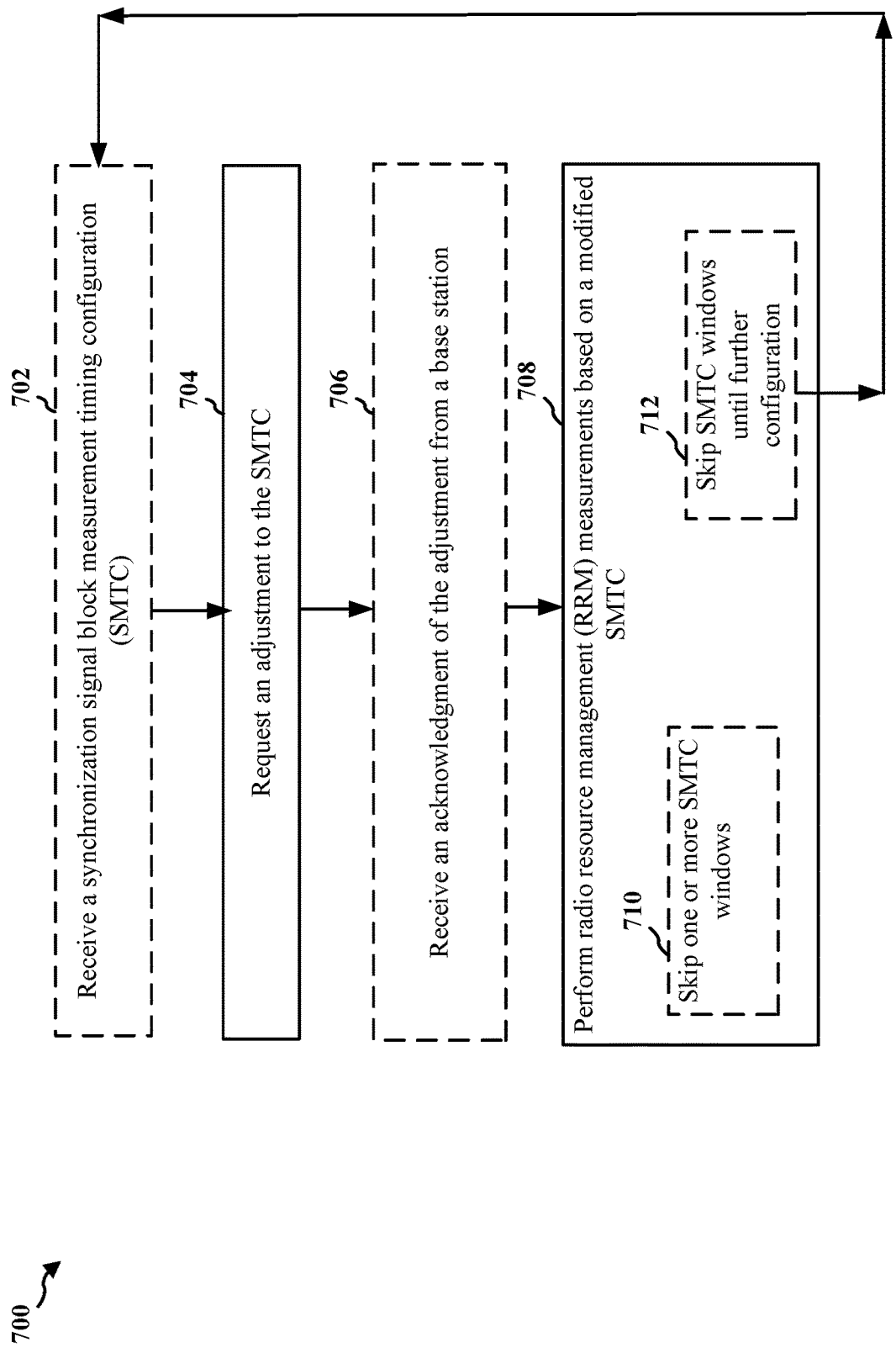
FIG. 7 is a flowchart of a method of wireless communication at a UE.

FIG. 7 is a flowchart 700 of a method of wireless communication. The method may be performed by a UE (e.g., the UE 104, 350. 402; the apparatus 902). Optional aspects are illustrated with a dashed line.

At 702, the UE receives a SMTC configuration. For example, reception 702 may be performed by SMTC configuration reception component 940 of FIG. 9. In some aspects, reception 702 may include aspects described in connection with reception 406 of FIG. 4. The SMTC configuration may include aspects described in connection with FIG. 4 or FIG. 6, for example.

At 704, the UE requests an adjustment to the SMTC. For example, request 704 may be performed by SMTC configuration adjustment component 942 of FIG. 9. In some aspects, request 704 may include aspects described in connection with request 410 of FIG. 4. In some aspects, the adjustment requested by the UE includes a change for a period of time. In some aspects, the adjustment requested by the UE includes the change to one or more SMTC windows of the SMTC, such as one or more next SMTC windows. In some aspects, the change corresponds to skipping the one or more SMTC windows for the RRM measurements. In some aspects, the adjustment requested by the UE includes a persistent change that is applicable to all later SMTC windows until further configuration. In some aspects, the adjustment requested by the UE includes one or more of: an adjusted periodicity, an adjusted offset, an adjusted duration, an adjusted PCI list, a modification for a second SMTC window. In some aspects, the UE requests the adjustment to the SMTC in at least one of a MAC-CE, UCI, or a RRC message.

At 706, the UE optionally receives an acknowledgment of the adjustment from a base station. For example, reception 706 may be performed by adjustment ACK reception component 944 of FIG. 9. In some aspects, reception 706 may include aspects described in connection with acknowledgment 412 of FIG. 4. In some aspects, the acknowledgement is received in a PDCCH or a feedback channel.

At 708, the UE performs RRM measurements based on a modified SMTC. For example, measurement 708 may be performed by RRM measurement component 946 of FIG. 9. In some aspects, measurement 708 may include aspects described in connection with skipping 416 of FIG. 4. In aspects where the UE received an acknowledgement of the adjustment from the base station, the UE may perform RRM measurements based on the modified SMTC a period of time after receiving the acknowledgement. In some aspects, the UE performs the RRM measurements based on the modified SMTC a period of time after transmitting a request for the adjustment. In aspects where the adjustment requested by the UE includes the change to one or more SMTC windows of the SMTC, the UE may, as part of 708, at 710, skip the one or more SMTC windows then resume RRM measurements. In aspects where the adjustment requested by the UE includes a persistent change, the UE may, as part of 708, at 712, skip SMTC windows until receiving further SMTC from the base station.

Figure 8:
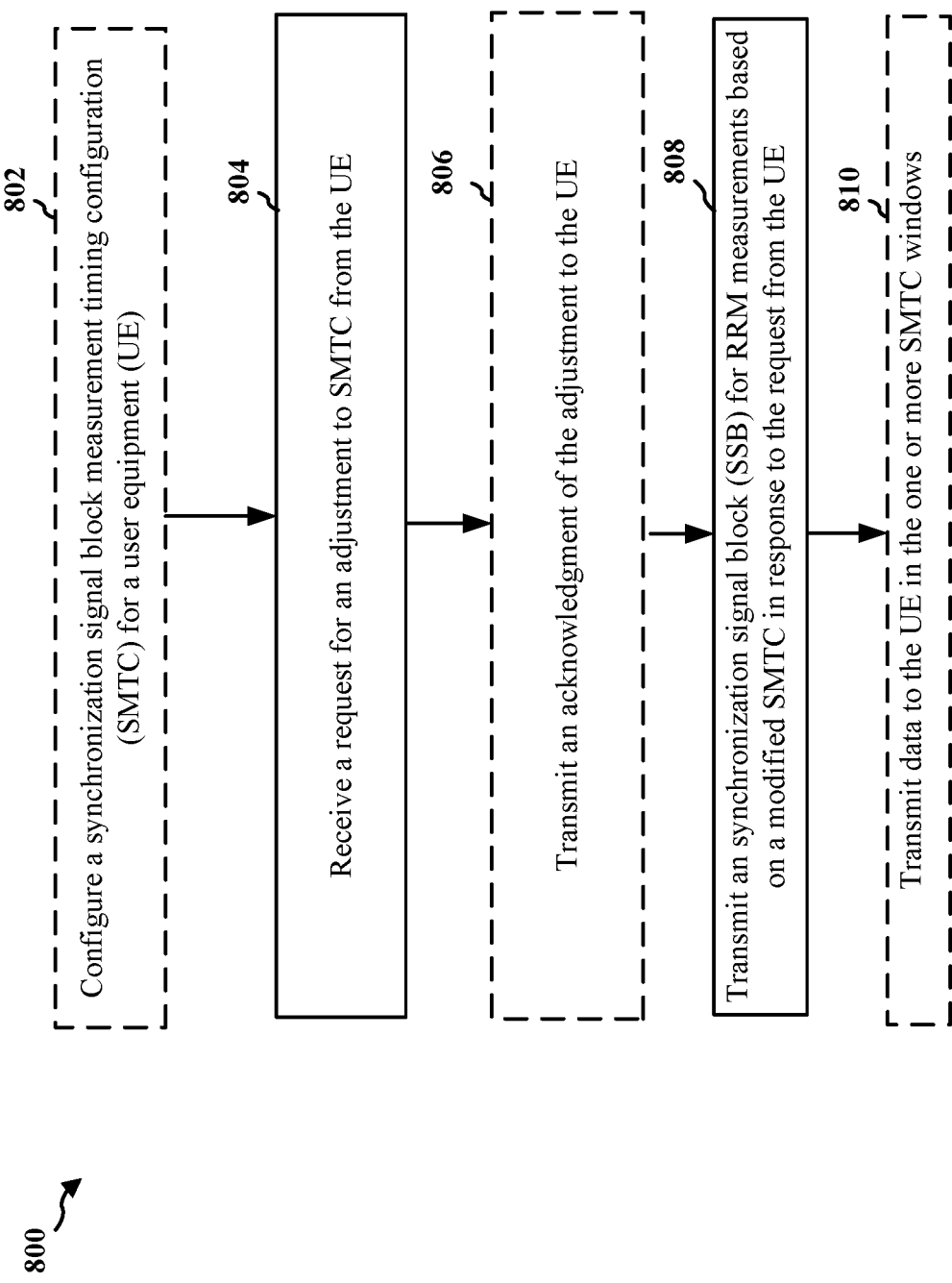
FIG. 8 is a flowchart of a method of wireless communication at a base station.

FIG. 8 is a flowchart 800 of a method of wireless communication. The method may be performed by a base station (e.g., the base station 102/180, 310, 404; the apparatus 1002). Optional aspects are illustrated with a dashed line.

At 802, the base station configures a SMTC for a UE. For example, configuration 802 may be performed by SMTC configuration transmission component 1040 of FIG. 10. In some aspects, configuration 802 may include aspects described in connection with 406 of FIG. 4. The SMTC configuration may include aspects described in connection with FIG. 4 or FIG. 6, for example.

At 804, the base station receives a request for an adjustment to SMTC from the UE. For example, reception 804 may be performed by adjustment reception component 1044 of FIG. 10. In some aspects, reception 804 may include aspects described in connection with request 410 of FIG. 4. In some aspects, the adjustment requested by the UE includes a change for a period of time. In some aspects, the adjustment requested by the UE includes the change to one or more SMTC windows of the SMTC, such as one or more next SMTC windows. In some aspects, the change corresponds to skipping the one or more SMTC windows for the RRM measurements. In some aspects, the adjustment requested by the UE includes a persistent change that is applicable to all later SMTC windows until further configuration. In some aspects, the adjustment requested by the UE includes one or more of: an adjusted periodicity, an adjusted offset, an adjusted duration, an adjusted PCI list, a modification for a second SMTC window. In some aspects, the adjustment to the SMTC is received in in at least one of a MAC-CE, UCI, or a RRC message.

At 806, the base station transmits an acknowledgment of the adjustment to the UE. For example, transmission 806 may be performed by adjustment ACK component 1046 of FIG. 10. In some aspects, the acknowledgement is transmitted in a PDCCH or a feedback channel. In some aspects, transmission 806 may include aspects described in connection with acknowledgment 412 of FIG. 4.

At 808, the base station transmits an SSB for RRM measurements based on a modified SMTC in response to the request from the UE. For example, transmission 808 may be performed by SSB transmission component 1048 of FIG. 10. In some aspects, the base station transmits the SSB based on the modified SMTC a period of time after receiving the request for the adjustment. In aspects where the base station transmitted the acknowledgment of the adjustment to the UE, the base station may transmits the SSB based on the modified SMTC based on a period of time after transmitting the acknowledgement. In some aspects, transmission 808 may include aspects described in connection with transmission 414 of FIG. 4.

At 810, the base station transmits data to the UE in the one or more SMTC windows (i.e., using resources previously scheduled for the one or more SMTC windows for data transmission). For example, transmission 810 may be performed by data transmission component 1042 of FIG. 10. In some aspects, transmission 810 may include aspects described in connection with 412 of FIG. 4.

Figure 9:
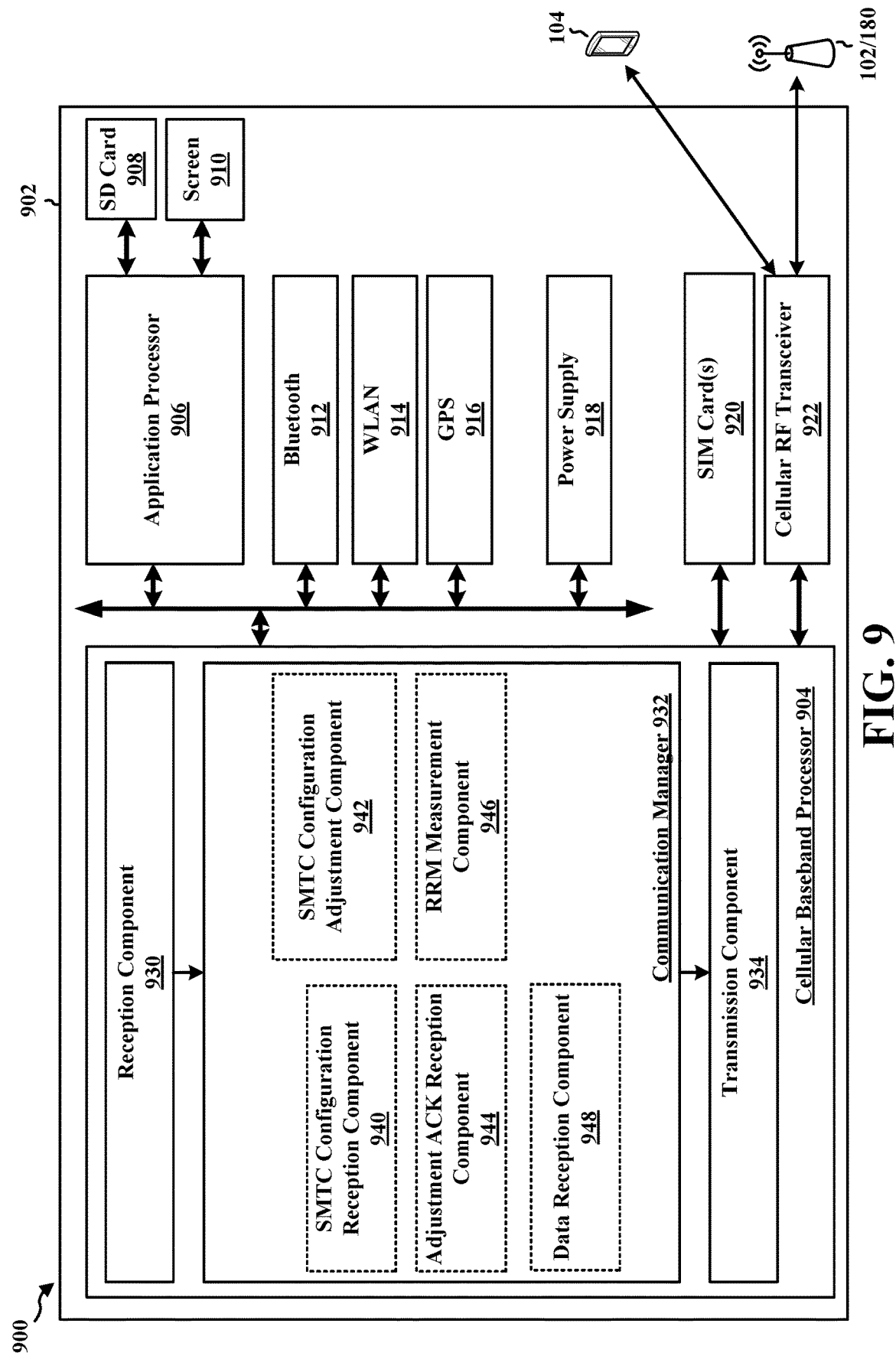
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a SMTC configuration reception component 940 that is configured to receive a SMTC, e.g., as described in connection with 702 of FIG. 7. The communication manager 932 further includes a SMTC configuration adjustment component 942 that is configured to request an adjustment to the SMTC, e.g., as described in connection with 704 of FIG. 7. The communication manager 932 further includes an adjustment ACK reception component 944 that is configured to receive an acknowledgment of the adjustment from a base station, e.g., as described in connection with 706 of FIG. 7. The communication manager 932 further includes a RRM measurement component 946 that is configured to perform RRM measurements based on a modified SMTC, e.g., as described in connection with 708 of FIG. 7. The communication manager 932 further includes a data reception component 948 that is configured to receive data from the base station, e.g., as described in connection with 1004 of FIG. 10.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for requesting an adjustment to a SMTC and means for performing RRM measurements based on a modified SMTC. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
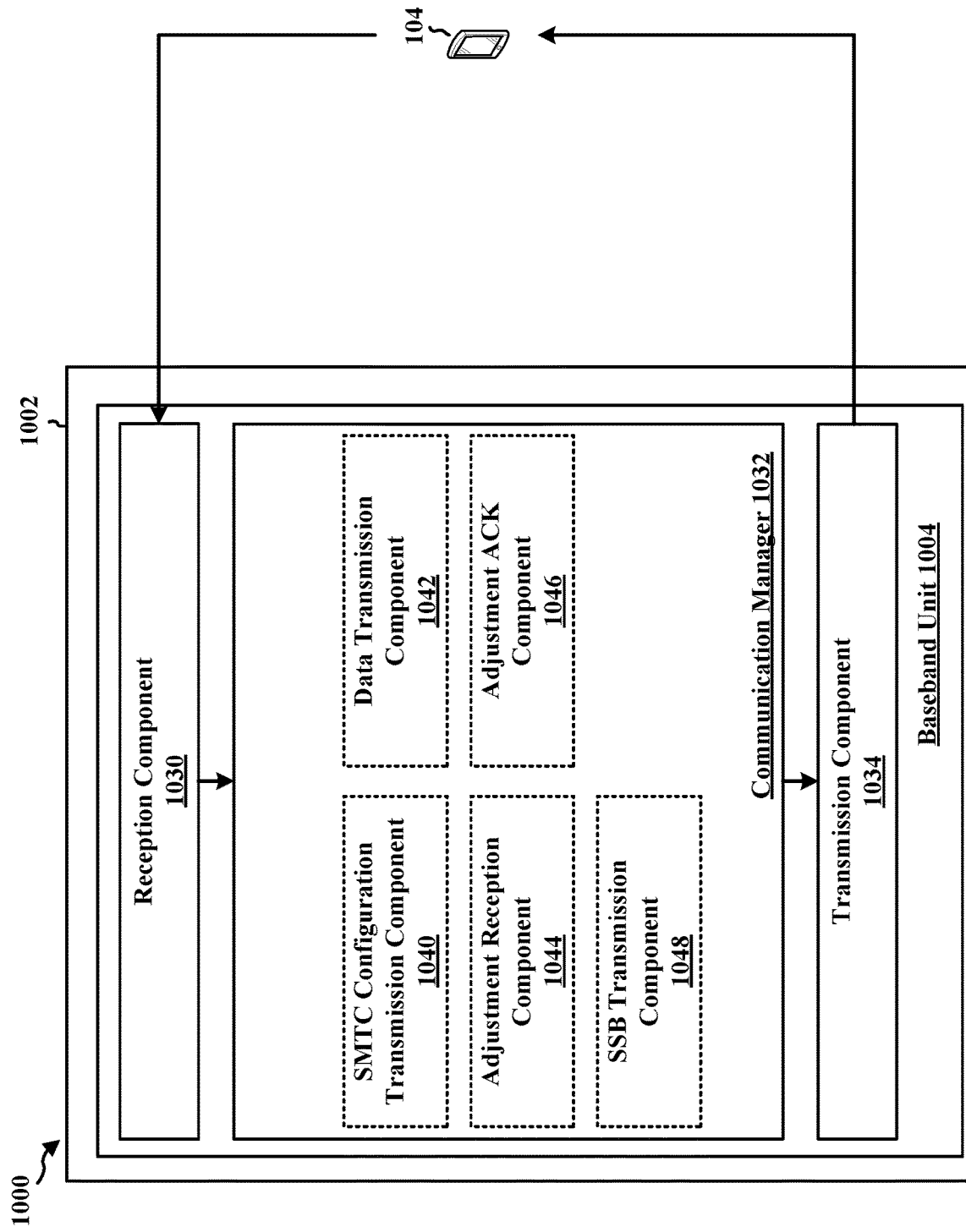
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a SMTC configuration transmission component 1040 that that is configured to configure a SMTC for a UE, e.g., as described in connection with 802 of FIG. 8. The communication manager 1032 further includes a data transmission component 1042 that that is configured to transmit data to the UE, e.g., as described in connection with 810 of FIG. 8. The communication manager 1032 further includes an adjustment reception component 1044 that that is configured to receive a request for an adjustment to SMTC from the UE, e.g., as described in connection with 804 of FIG. 8. The communication manager 932 further includes an adjustment ACK component 1046 that is configured to transmit an acknowledgment of the adjustment to the UE, e.g., as described in connection with 806 of FIG. 8. The communication manager 1032 further includes an SSB transmission component 1048 that is configured to transmit an SSB for RRM measurement based on a modified SMTC in response to the request from the UE, e.g., as described in connection with 808 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for configuring a SMTC for a UE, means for receiving a request for an adjustment to SMTC from the UE, and means for transmitting an SSB for RRM measurements based on a modified SMTC in response to the request from the UE. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Further disclosure is included in the Appendix.

The following examples are illustrative only and aspects thereof may be combined with aspects of other embodiments or teaching described herein, without limitation.

Example 1 is a method of wireless communication at a user equipment (UE), comprising: requesting an adjustment to a SMTC; and performing RRM measurements based on a modified SMTC.

In Example 2, the method of Example 1 further includes that the adjustment requested by the UE comprises a change for a period of time.

In Example 3, the method of Example 2 further includes that the adjustment requested by the UE comprises the change to one or more SMTC windows of the SMTC.

In Example 4, the method of Example 3 further includes that change corresponds to skipping the one or more SMTC windows for the RRM measurements.

In Example 5, the method of any of Example 1-4 further includes that the adjustment requested by the UE comprises a persistent change.

In Example 6, the method of any of Example 1-5 further includes that the adjustment requested by the UE comprises one or more of: an adjusted periodicity, an adjusted offset, an adjusted duration, an adjusted PCI list, or a modification for a second SMTC window.

In Example 7, the method of any of Example 1-6 further includes that requests the adjustment to the SMTC in at least one of a MAC-CE, UCI, or RRC message.

In Example 8, the method of any of Example 1-7 further includes that the UE performs the RRM measurements based on the modified SMTC a period of time after transmitting a request for the adjustment.

In Example 9, the method of any of Example 1-8 further includes receiving an acknowledgment of the adjustment from a base station, wherein the UE performs the RRM measurements based on the modified SMTC a period of time after receiving the acknowledgement.

In Example 10, the method of Example 9 further includes that the acknowledgement is received in a PDCCH or a feedback channel.

Example 11 is a device including one or more processors and one or more memories in electronic communication with the one or more processors storing instructions executable by the one or more processors to cause the device to implement a method as in any of Examples 1-10.

Example 12 is a system or apparatus including means for implementing a method or realizing an apparatus as in any of Examples 1-10.

Example 13 is a non-transitory computer readable medium storing instructions executable by one or more processors to cause the one or more processors to implement a method as in any of Examples 1-10.

Example 14 is a method of wireless communication at a base station, comprising: configuring a SMTC for a UE; receiving a request for an adjustment to SMTC from the UE; and transmitting an SSB for RRM measurements based on a modified SMTC in response to the request from the UE.

In Example 15, the method of Example 14 further includes that the adjustment requested by the UE comprises a change for a period of time.

In Example 16, the method of Example 15 further includes that the adjustment requested by the UE comprises the change to one or more SMTC windows of the SMTC.

In Example 17, the method of Example 16 further includes that the change corresponds to skipping the one or more SMTC windows for the RRM measurements.

In Example 18, the method of any of Example 14-17 further includes transmitting data to the UE in the one or more SMTC windows.

In Example 19, the method of any of Example 14-18 further includes that the adjustment requested by the UE comprises a persistent change.

In Example 20, the method of any of Example 14-19 further includes that the adjustment requested by the UE comprises one or more of: an adjusted periodicity, an adjusted offset, an adjusted duration, an adjusted PCI list, or a modification for a second SMTC window.

In Example 21, the method of any of Example 14-20 further includes that the request is received from the UE in at least one of a MAC-CE, UCI, or a RRC message.

In Example 22, the method of any of Example 14-21 further includes that the base station transmits the SSB based on the modified SMTC a period of time after receiving the request for the adjustment.

In Example 23, the method of any of Example 14-22 further includes: transmitting an acknowledgment of the adjustment to the UE, wherein the base station transmits the SSB based on the modified SMTC based on a period of time after transmitting the acknowledgement.

In Example 24, the method of any of Example 14-23 further includes that, wherein the acknowledgement is transmitted in PDCCH or a feedback channel.

Example 25 is a device including one or more processors and one or more memories in electronic communication with the one or more processors storing instructions executable by the one or more processors to cause the device to implement a method as in any of Examples 14-24.

Example 26 is a system or apparatus including means for implementing a method or realizing an apparatus as in any of Examples 14-24.

Example 27 is a non-transitory computer readable medium storing instructions executable by one or more processors to cause the one or more processors to implement a method as in any of Examples 14-24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   requesting an adjustment to a synchronization signal block measurement timing configuration (SMTC), wherein the adjustment requested by the UE comprises a persistent change; and
   performing radio resource management (RRM) measurements based on a modified SMTC, wherein the adjustment comprises skipping one or more SMTC windows of the SMTC for the RRM measurements.

2. The method of claim 1, wherein the adjustment requested by the UE comprises the change to the one or more SMTC windows of the SMTC.

3. The method of claim 1, wherein the adjustment requested by the UE comprises one or more of:
   an adjusted periodicity,
   an adjusted offset,
   an adjusted duration,
   an adjusted PCI list, or
   a modification for a second SMTC window.

4. The method of claim 1, wherein the UE requests the adjustment to the SMTC in at least one of a medium access control-control element (MAC-CE), uplink control information (UCI), or a radio resource control (RRC) message.

5. The method of claim 1, wherein the UE performs the RRM measurements based on the modified SMTC a period of time after transmitting a request for the adjustment.

6. The method of claim 1, further comprising:
   receiving an acknowledgment of the adjustment from a base station, wherein the UE performs the RRM measurements based on the modified SMTC a period of time after receiving the acknowledgement.

7. The method of claim 6, wherein the acknowledgement is received in a physical downlink control channel (PDCCH) or a feedback channel.

8. The method of claim 1, further comprising:
   receiving data in the one or more SMTC windows.

9. A method of wireless communication at a base station, comprising:
   configuring a synchronization signal block measurement timing configuration (SMTC) for a user equipment (UE);
   receiving a request for an adjustment to SMTC from the UE, wherein the adjustment requested by the UE comprises a persistent change; and
   transmitting an SSB for RRM measurements based on a modified SMTC in response to the request from the UE, wherein the adjustment comprises one or more SMTC windows of the SMTC being skipped for the RRM measurements.

10. The method of claim 9, wherein the adjustment requested by the UE comprises the change to the one or more SMTC windows of the SMTC.

11. The method of claim 9, further comprising:
transmitting data to the UE in the one or more SMTC windows.

12. The method of claim 9, wherein the adjustment requested by the UE comprises one or more of:
an adjusted periodicity,
an adjusted offset,
an adjusted duration,
an adjusted PCI list, or
a modification for a second SMTC window.

13. The method of claim 9, wherein the request is received from the UE in at least one of a medium access control-control element (MAC-CE), uplink control information (UCI), or a radio resource control (RRC) message.

14. The method of claim 9, wherein the base station transmits the SSB based on the modified SMTC a period of time after receiving the request for the adjustment.

15. The method of claim 9, further comprising:
transmitting an acknowledgment of the adjustment to the UE, wherein the base station transmits the SSB based on the modified SMTC based on a period of time after transmitting the acknowledgement.

16. The method of claim 15, wherein the acknowledgement is transmitted in a physical downlink control channel (PDCCH) or a feedback channel.

17. An apparatus of wireless communication at a user equipment (UE), comprising:
memory; and
one or more processors, coupled to the memory, the one or more processors configured to:
request an adjustment to a synchronization signal block measurement timing configuration (SMTC), wherein the adjustment comprises a persistent change; and
perform radio resource management (RRM) measurements based on a modified SMTC, wherein the adjustment comprises one or more SMTC windows of the SMTC being skipped for the RRM measurements.

18. The apparatus of claim 17, wherein the adjustment comprises the change to the one or more SMTC windows of the SMTC.

19. The apparatus of claim 17, wherein the one or more processors are further configured to:
receive data in the one or more SMTC windows.

20. The apparatus of claim 17, wherein the adjustment comprises one or more of:
an adjusted periodicity,
an adjusted offset,
an adjusted duration,
an adjusted PCI list, or
a modification for a second SMTC window.

21. The apparatus of claim 17, wherein the adjustment to the SMTC is requested in at least one of a medium access control-control element (MAC-CE), uplink control information (UCI), or a radio resource control (RRC) message.

22. The apparatus of claim 17, wherein the RRM measurements is performed based on the modified SMTC a period of time after the request for the adjustment is transmitted.

23. The apparatus of claim 17, wherein the one or more processors are further configured to:
receive an acknowledgment of the adjustment from a base station, wherein the RRM measurements is performed based on the modified SMTC a period of time after receiving the acknowledgement.

24. The apparatus of claim 23, wherein the acknowledgement is received in a physical downlink control channel (PDCCH) or a feedback channel.

* * * * *